US012684062B2

(12) United States Patent
Kekempanos et al.

(10) Patent No.: US 12,684,062 B2
(45) Date of Patent: Jul. 14, 2026

(54) DETECTING A DISCONNECT AT A DSLAM

(71) Applicant: British Telecommunications Public Limited Company, London (GB)

(72) Inventors: Lykourgos Kekempanos, London (GB); Feiyu Fang, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 19/138,581

(22) PCT Filed: Nov. 7, 2023

(86) PCT No.: PCT/EP2023/080959
§ 371 (c)(1),
(2) Date: Jun. 12, 2025

(87) PCT Pub. No.: WO2024/132282
PCT Pub. Date: Jun. 27, 2024

(65) Prior Publication Data
US 2026/0059047 A1 Feb. 26, 2026

(30) Foreign Application Priority Data
Dec. 19, 2022 (EP) .................................... 22214683

(51) Int. Cl.
*H04M 3/08* (2006.01)
*H04M 3/30* (2006.01)

(52) U.S. Cl.
CPC ............. *H04M 3/085* (2013.01); *H04M 3/30* (2013.01); *H04M 3/306* (2013.01)

(58) Field of Classification Search
None
See application file for complete search history.

(56) References Cited

U.S. PATENT DOCUMENTS 6,456,694 B1 * 9/2002 Posthuma ................ H04M 3/30
379/1.04
6,744,854 B2 * 6/2004 Berrier ..................... H04B 3/46
379/22

(Continued)

OTHER PUBLICATIONS

Combined Search and Examination Report for GB2219180.3 dated May 31, 2023, 5 pages.

(Continued)

*Primary Examiner* — Quoc D Tran
(74) *Attorney, Agent, or Firm* — Nixon & Vanderhye P.C.

(57) ABSTRACT

Detecting a short disconnection in a digital subscriber line, for example where the disconnection is near the DSLAM. A SELT UER trace is obtained from the digital subscriber line. The trace is analysed to determine its smoothness, as relatively smooth traces result from shorter lines. The smoothness measure can be calculated by applying some function to the differences of the amplitude between successive frequency tones. Two examples of functions that have been found to work well are a sum and a standard deviation. The result of the function can be compared to a threshold to determine if a short disconnection has occurred. Such a situation can occur when a cable has been disconnected from a patch panel for example.

7 Claims, 5 Drawing Sheets

(56) References Cited

U.S. PATENT DOCUMENTS

| | | | | |
|---|---|---|---|---|
| 6,819,744 B1 * | 11/2004 | Banwell | ............... | H04M 3/002 |
| | | | | 379/1.04 |
| 7,236,573 B2 * | 6/2007 | Bachorik | ............. | H04M 3/323 |
| | | | | 379/27.01 |
| 7,362,850 B2 * | 4/2008 | Jensen | ................. | H04M 3/306 |
| | | | | 379/1.01 |
| 7,558,315 B2 | 7/2009 | Cioffi et al. | | |
| 7,809,116 B2 | 10/2010 | Rhee et al. | | |
| 8,130,911 B2 * | 3/2012 | Borjesson | ............. | H04M 3/305 |
| | | | | 379/22.01 |
| 8,295,444 B2 | 10/2012 | Dinesh et al. | | |
| 8,300,771 B2 | 10/2012 | Dinesh et al. | | |
| 9,071,678 B2 | 6/2015 | Yang et al. | | |
| 9,148,504 B2 | 9/2015 | Berg et al. | | |
| 10,051,117 B2 | 8/2018 | Zahedi et al. | | |
| 10,887,450 B1 * | 1/2021 | Wilson | ................... | H04M 3/36 |
| 2006/0251160 A1 * | 11/2006 | Fazlollahi | ............... | H04B 3/46 |
| | | | | 375/222 |
| 2009/0310755 A1 | 12/2009 | Dinesh et al. | | |
| 2015/0163349 A1 * | 6/2015 | Ardestani | ............ | H04M 3/306 |
| | | | | 379/22.02 |

OTHER PUBLICATIONS

Extended European Search Report for EP Application No. 22214683.9 dated Jun. 13, 2023, 6 pages.

International Search Report and Written Opinion of the ISA for PCT/EP2023/080959 dated Jan. 22, 2024, 14 pages.

D.E. Dodds, "Single-Ended FDR to Locate and Specifically Identify DSL Loop Impairments", IEEE International Conference on Communications, 2007, 2 pages (Abstract only).

Charlie Chen-Yui Yang et al, "Method and System of Performance Monitoring to Detect VDSL Service Degradation", International Conference on Cyber-Enabled Distributed Computing and Knowledge Discovery, 2010, 2 pages (Abstract only).

International Preliminary Report on Patentability dated Jul. 3, 2025, issued for International Application No. PCT/EP2023/080959 (8 pages).

Yang, Charlie Chen-Yui et al., "Method and System of Performance Monitoring to Detect VDSL Service Degradation", 2010 International Conference on Cyber-Enabled Distributed Computing and Knowledge Discovery, 2010 IEEE (8 pages).

Dodds, David E. "Single-ended FDR to Locate and Specifically Identify DSL loop Impairments", text paper peer reviewed at direction of IEEE Communications Society subject matter experts for publication in the ICC 2007 proceedings, 2007 IEEE (6 pages).

* cited by examiner

500 Receive a SELT UER trace for line

502 Calculate a smoothness measure of the trace by applying a function to the differences between successive tones across frequency spectrum 504 Compare the smoothness measure to a threshold value 506 Return a disconnect near DSLAM/at cabinet dependent on the comparison

DETECTING A DISCONNECT AT A DSLAM

CROSS-REFERENCE TO RELATED APPLICATIONS

This application is the U.S. national phase of International Application No. PCT/EP2023/080959 filed Nov. 7, 2023 which designated the U.S. and claims priority to EP 22214683.9 filed Dec. 19, 2022, the entire contents of each of which are hereby incorporated by reference.

FIELD OF THE INVENTION

This invention relates to a method of detecting a short disconnect or termination to a digital subscriber line, in particular where the disconnect is near to a digital subscriber line access module.

BACKGROUND TO THE INVENTION

Digital subscriber line (DSL) technology, often referred to as "broadband", is a family of services that provides digital data transmission over the metallic twisted copper pairs that form part of a local telephone network. DSL is commonly used to provide a customer's home with a network connection, typically to the Internet via an ISP.

However, DSL lines may develop to faults, arising for example from faulty joints, disconnections or interference. Various approaches have been used to identify and locate faults. For example, if a DSL line is synchronised and able to provide some level of service, then various DSL line parameters (e.g. SNR margin, line attenuation, bit error rates) can be measured and analysed to identify certain of fault. These in-sync measurements are typically made at the DSLAM (digital subscriber line access multiplexer). Diagnostic exchange tests can also be done by specialist line test equipment located at the central office, and include copper line tests in the electrical domain. These include measurements such as capacitances and resistances, which can also be analysed to help identify faults.

However, in very high speed DSL (VDSL) services, often referred to as "Fibre to the Cabinet", specialist line test equipment is generally not available, as the DSLAM for VDSL services is typically not located in an exchange, but instead in a primary connection point (PCP) such as a roadside cabinet, which may not have the physical capacity for such equipment, or such equipment may be prohibitively costly to install in the cabinet.

Furthermore, many of the measurements made by the DSLAM that are currently used to identify faults rely on a DSL line being initialised and synchronised. Therefore, certain faults such a physically disconnected line make it impossible for a line to initialise and synchronise, thus making such measurements impossible.

Single Ended Line Tests, SELTs, as set out in ITU-T G.996.2, can be used to identify VDSL line conditions without the need for connectivity to the exchange or line sync, as they are based on a single sided test signal launched directly from the DSLAM line driver. SELT techniques typically use frequency domain UER (uncalibrated echo response) traces obtained from a frequency sweep over the VDSL spectrum, which reflects from the end of the line and results in a per-tone interference pattern detected at the DSLAM modem.

SELT UER traces are highly sensitive to changes in the electrical state of the line, and so can be analysed to identify anomalous behaviour, and thus detect potential faults on a line by comparing historical traces to a current trace.

SELT UER traces can also be used to determine a line length by using a method involving an Inverse Fourier Transform, where the signal reflection time can be multiplied by signal speed to give a line length. This can help determine potential terminations or disconnections in the line, which would result in a line length that is shorter than expected.

However, this Inverse Fourier Transform method cannot directly detect reflections at very short loop lengths, when a termination or disconnection occurs very close to the DSLAM for example. This is because with lines that are very short in length, the frequency sweep is reflected almost straight away and thus does not form significant harmonic features. Additionally, fast Fourier transform artifacts often hide short reflections of less than around 100 m.

US patent U.S. Pat. No. 10,887,450B1 describes identifying and locating a fault in a telecommunication line using line test data for that telecommunication line. A series of line tests can be performed on a selected telecommunication line experiencing problems. The results from the series of line tests can be analyzed to identify differences in the results between the line tests. The identified differences can then be used to determine if a fluctuation is present in the telecommunication line. If a fluctuation is determined to be present in the telecommunication line, the identified differences can also be used to determine a location of the fluctuation relative to reference location such as the distribution point where the telecommunication line originates US patent application US20060251160A1 describes SELT systems and methods using a Frequency-Domain Reflectometry (FDR) that use one or more echo signals originated by transmitting a periodic multi-tone signal, e.g., a REVERB signal, reflected from the hybrid and analyzed in the frequency domain. The REVERB signal is part of the ADSL modem training signal. Methods are able to recognize, from one end of a twisted-pair DSL line, the state of the other end of the line, i.e., whether the other end is open, short, or terminated and can estimate the length of the open or short, point from the originating end of the line with reasonable accuracy.

SUMMARY OF THE INVENTION

According to one aspect of the present invention, there is provided a method as set out in claim 1.

According to another aspect of the present invention, there is provided a test module as set out in claim 7.

Aspects of the invention can detect short disconnections, which effectively result in a shortened line. As a reflection from a very short distance will be largely unchanged from the outward frequency sweep due to insufficient distance to form a significant phase change, the re-detected signal and the outward signal undergo almost entirely constructive interference with very little destructive interference. This forms a UER trace that is mostly flat, with only a very slight curvature. Aspects of the invention detect such a trace.

The slight curvature in the detected trace is due to very weak harmonic features that are the beginnings of oscillations over the frequency axis. In contrast, if the line was longer, then the harmonics would be readily visible with more significant harmonics (and not being mostly flat). Short disconnect lines might be caused by a disconnected jumpering cable within the DSLAM or PCP, or some other fault involving a disconnect at the DSLAM/PCP. It is advantageous to identify these situations so that they can be resolved, for example by an engineer visit, so as to avoid misdiagnosis as some other fault.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention present a method of detecting a short disconnection in a digital subscriber line, for example where the disconnection is near the DSLAM. A SELT UER trace is obtained from the digital subscriber line. The trace is analysed to determine its smoothness, as relatively smooth traces result from shorter lines. The smoothness measure can be calculated by applying some function to the differences of the amplitude between successive frequency tones. Two examples of functions that have been found to work well are a sum and a standard deviation. The result of the function can be compared to a threshold to determine if a short disconnection has occurred. Such a situation can occur when a cable has been disconnected from a patch panel for example.

Figure 1:
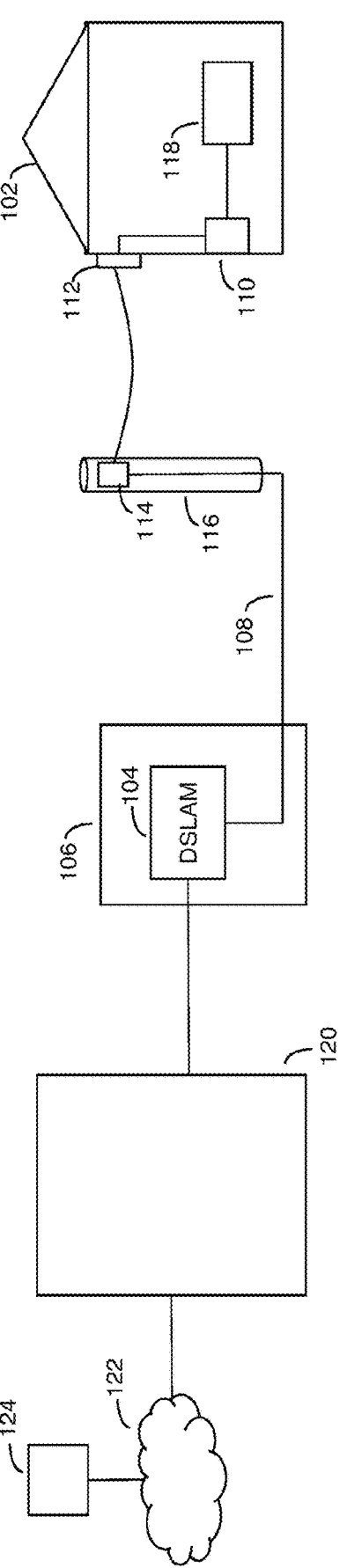
FIG. 1 is a system diagram showing a digital subscriber line running to a customer premises.

FIG. 1 is a simplified system diagram illustrating a telecommunications network 100 including a customer's premises 102. The customer's premises 102 is connected to a DSLAM 104 located at a primary connection point PCP 106, which is typically a roadside cabinet. The connection between the customer premises 102 and DSLAM 104 is provided by a telephone line 108, made of a pair of twisted copper or aluminium wires. Specifically, a network termination equipment NTE 110 is at the customer premises 102 end of the line 108. The NTE 110 is often referred to as a line box or master socket, and is the demarcation point between the telephone network and the customer wiring in the customer premises 102. The line 108 runs from the NTE 110 to a junction box 112, and then onto a distribution point DP 114. In this example, the DP 114 is located on a telephone pole 116. The line 106 then continues onto the PCP 106 and specifically the DSLAM 104. Within the customer premises 102, the NTE 110 is connected to customer premises equipment CPE 118, which is typically a router or home hub that includes a modem.

A DSLAM is a network element that provides digital subscriber line (DSL) services to connected lines and associated customer premises. The line 108 is thus also referred to as digital subscriber line, or DSL line. In this example, the DSLAM 104 provides a VDSL service on the line 108. The DSLAM 104 also has an onward connection, typically a fibre optic connection, to the local exchange 120, and from there onto data provisioning networks 122 via suitable connections and equipment. The data provisioning networks may include the internet and other networks. A skilled person will appreciate that there are other elements in the network 100 that have been omitted for simplicity, such as elements that provide standard PSTN services to the line 108.

It is envisaged that the line 108 can experience a disconnection anywhere along its length, which might occur for example as a result of a disconnection at a joint or damage to cabling. However, as discussed earlier, disconnections that occur very close to the DSLAM 104, such as at a junction at the PCP 106, are traditionally very difficult to detect.

Also shown connected to the data provisioning network is a test module or test server 124. The test module 124 comprises a processor and a data store, such as hard disk array or similar. The test module 124 gathers data from the DSLAM 104, and the processor can use that data, together with other data as required, to determine if there is a disconnection very close to the DSLAM 104.

Whilst the present example shows a DSLAM residing in a PCP (roadside cabinet), the invention would still be applicable to configurations where the DSLAM is situated somewhere else. For example, the invention could be applied to networks and services where the DSLAM is located in the local exchange 120.

Furthermore, FIG. 1 only shows a single line and associated elements. However, in practice there will be a number of lines, each serving a respective customer premises, connected to the DSLAM. Moreover, there will be many DSLAMs connected to the exchange, and nationally there will be many exchanges. Any number of these lines can be tested by the test server 124 using the methods described below.

An example of the method is summarised as follows. The test module 124 receives a SELT UER response (or test trace) for the line 108 from the DSLAM 104. The SELT UER response is obtained from the DSLAM 104 by performing SELT measurements after applying a frequency sweep over the VDSL spectrum on the line. A more detailed discussion of the SELT standard can be found in the International Telecommunication Union recommendation G.996.2, "Single-ended line testing for digital subscriber lines". SELT measurements consist of sending wideband, constant amplitude signals down a line, with the UER being the received signals reflected back from the line (over a frequency range).

Figure 2:
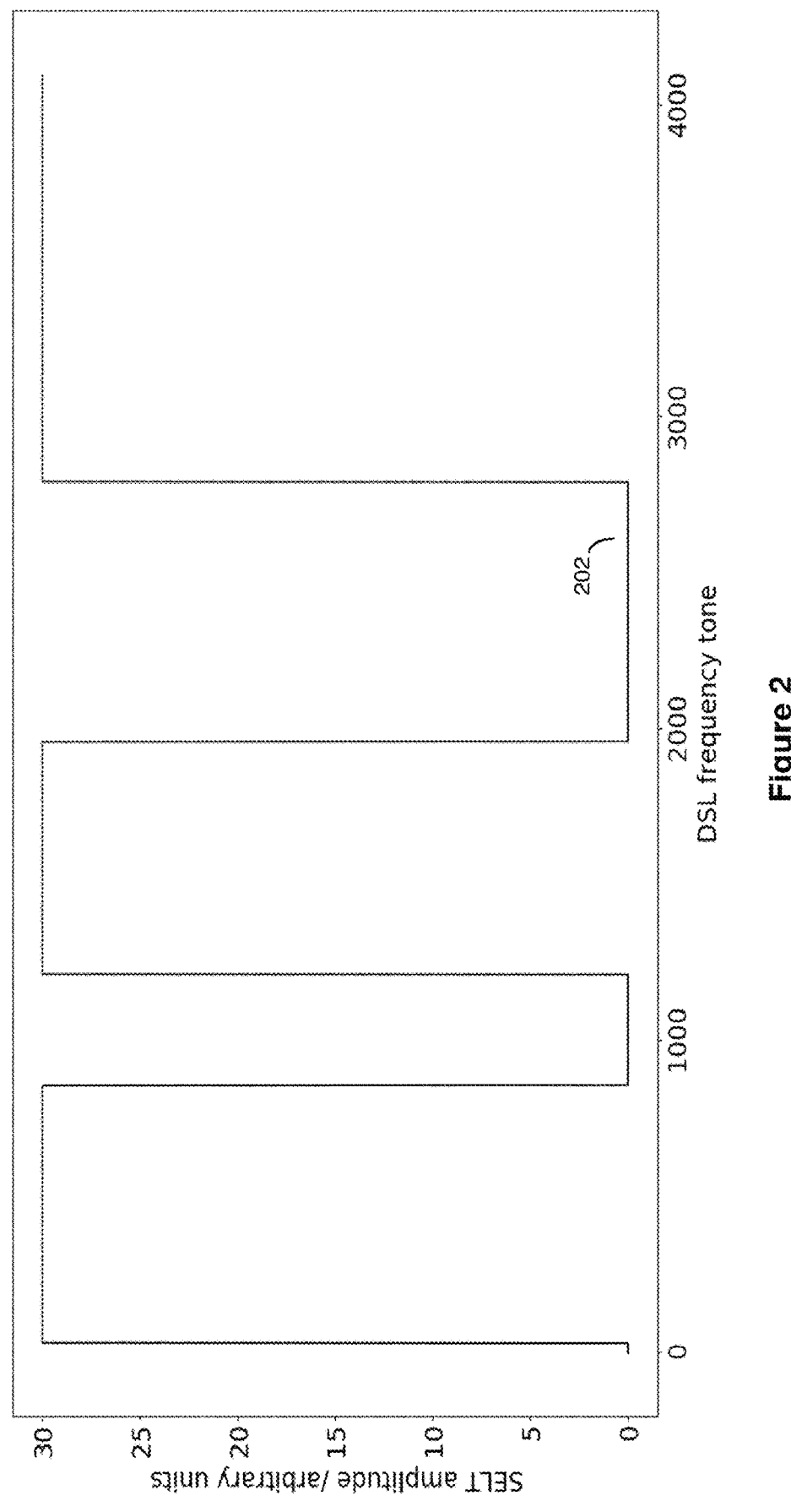
FIG. 2 is a frequency sweep (outbound) used to generate a SET UER.

In practice, the frequency sweep is applied to each tone/frequency on the downstream bands only—that is the bands that are used for downstream data transfer on a DSL line. The sweep signal is of a constant amplitude over each tone of the downstream bands. An example of such a sweep is shown in FIG. 2.

Figure 3:
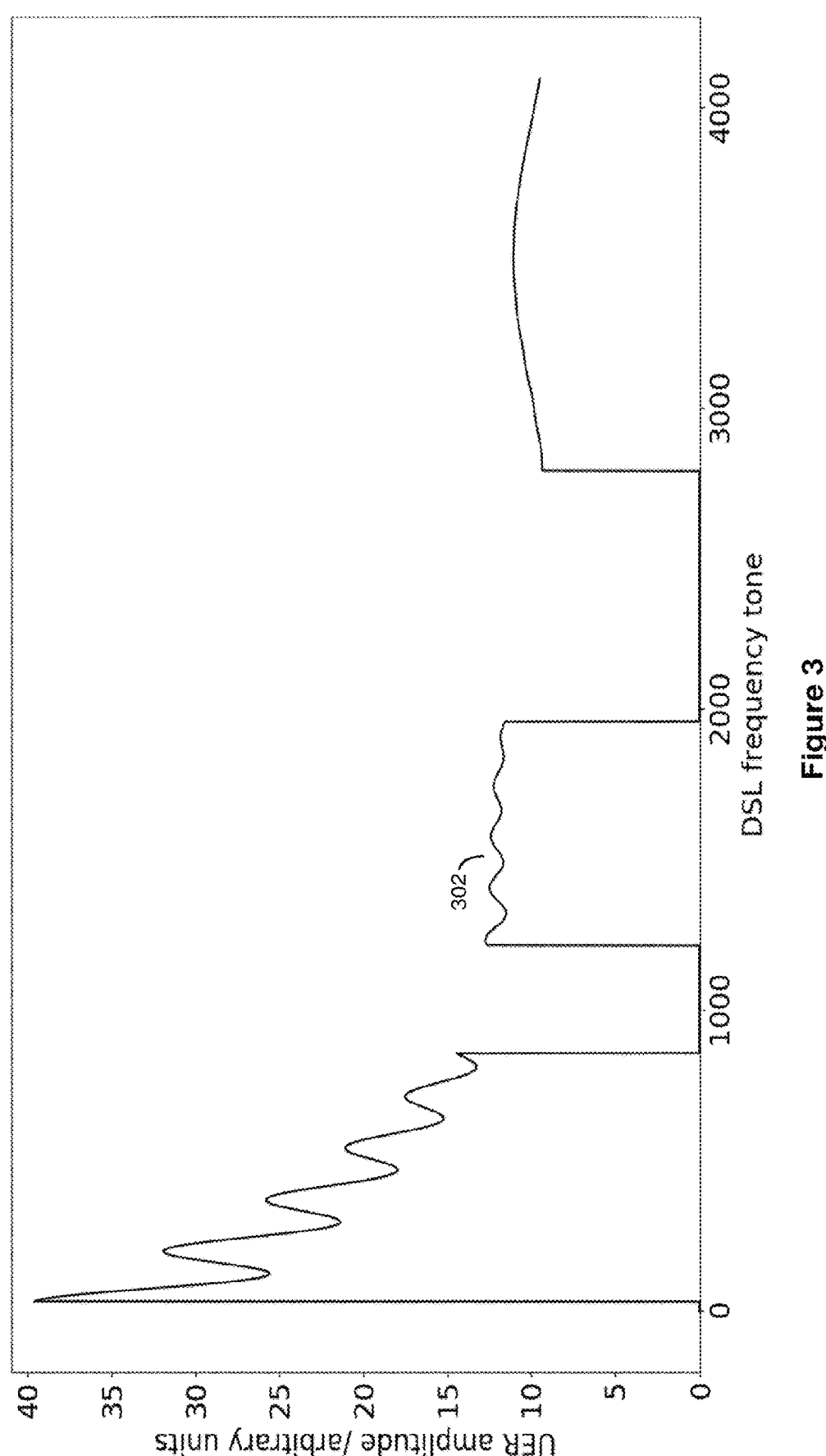
FIG. 3 is a SELT UER for an example line.

The SELT UER comprises an array of complex values (at discrete tones or frequencies) representing the phase and amplitude of the reflected waves detected over the frequency range. This is encoded as two arrays, Real and Imaginary components and a data scaling factor. An example of a SELT UER trace from a typical line is illustrated in a graph of detected amplitude plotted against frequency tone (which ranges from 0 to 4095) shown in plot 302 in FIG. 3.

Initially, the new SELT UER trace can be compared against an existing historical or baseline trace for the line that is representative of the line in good working condition. If the test trace is different, then the line can be tested to determine whether there is a short disconnection from the DSLAM (effectively a short line length).

In SELT UER traces of lines in good working condition, harmonic features in the lower frequencies result from the reflected frequency sweep signal from the end of the line, decreasing in amplitude with increasing frequency due to higher attenuation at higher frequencies. This can be seen from trace 302 in FIG. 3, where the line has experienced a clean reflection at non-trivial distance on a normal line.

Figure 4:
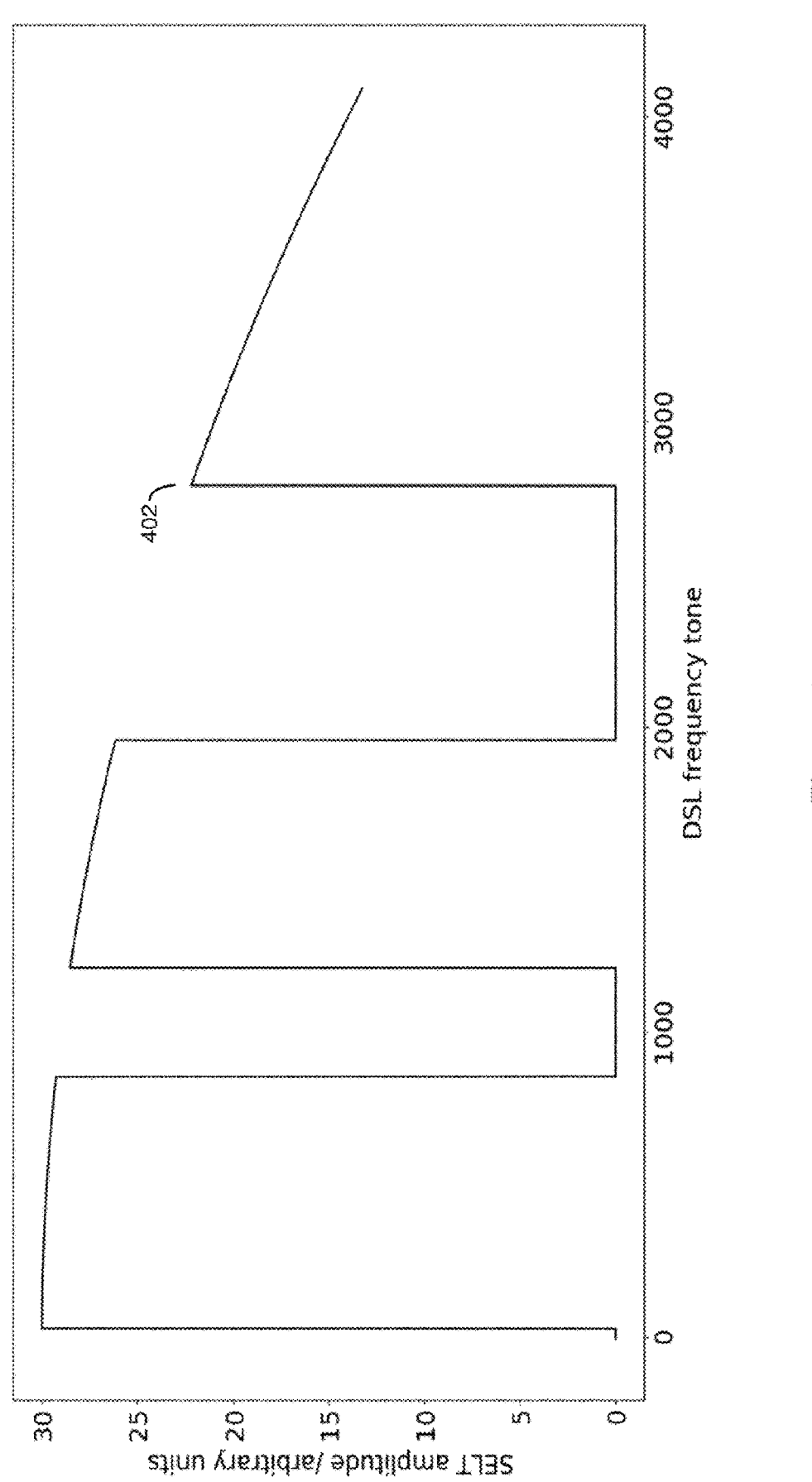
FIG. 4 is a SELT UER for an example line with a short disconnection.

However, if there is a disconnection at or very close to the DSLAM, the frequency sweep signal is reflected almost immediately and so is remains almost in phase with the outward signal, and therefore experiences almost no destructive interference. The resulting SELT UER trace is shown in FIG. 4, and is relatively unchanged compared to the outbound signal, as shown in FIG. 2. The SELT UER trace 402 in FIG. 4 has no significant harmonic features other than a slight reduction in detected amplitude towards higher frequencies due to the phase change caused by the short, but non-zero length of line as measured from the DSLAM.

Figure 5:
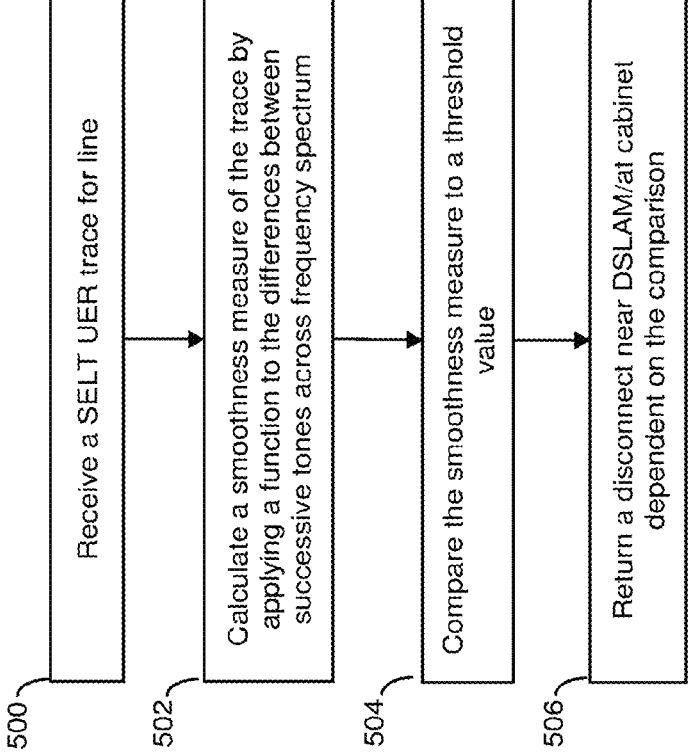
FIG. 5 is a flow chart summarising the steps of an example of the invention.

FIG. 5 is a flow chart summarising the steps of examples of the method used by the test module 124 to detect a trace of the type in FIG. 4, and thus detecting a disconnection in the line 108 located close to the DSLAM.

In step 500, the test module 124 receives a SELT UER response, or trace, for the test line 108. The SELT UER trace is obtained from the DSLAM 104 by performing SELT measurements as described above.

An example of such a trace is shown in FIG. 4, and comprises a per-tone trace 302 containing the measured SELT frequency sweep amplitude for each tone along the VDSL spectrum. Note the trace 402 only has data over the certain frequency bands (the downstream bands) over which the sweep was performed.

In step 502, the test module 124 calculates a smoothness measure of the trace 402. A smoothness measure can be calculated by applying some function to the differences of the amplitude between successive frequency tones (ignoring the tones where there is no data). Two examples of functions that have been found to work well are a sum and a standard deviation.

Starting with first example function, the test module 124 can calculate a smoothness measure as the sum of all the differences (of the amplitude) between successive frequency tones, with the frequency bands where there is no data being ignored. The sum S can be represented by the equation below:

$$S = \sum_{i=1}^{4095} |UER_i - UER_{i-1}|$$

A lower sum S is representative of a smoother trace, in contrast to a higher sum S, which is representative of less smooth trace. As discussed earlier, a smoother trace, in particular as measured by the sum S, is indicative of a termination close to or at the DSLAM.

Thus, in step 504, the calculated sum S is compared to a threshold, where the threshold is based on a trace that is relatively flat and smooth, for example by using a simulator to simulate a line of short length.

In step 506, if the calculated sum S is less than the threshold, then the test module 124 can return the result that there is a short disconnect in the line 108 close to or at the DSLAM.

If a line is determined as having a short disconnect, it can be flagged for further investigation such as an engineer visit. Even if an engineer is not dispatched, it is useful to flag such short disconnect lines so that they are not misdiagnosed as having some other fault when they might not.

As described earlier, an alternative function that could be applied in step 502 to calculate the smoothness is calculating the standard deviation of the differences (of the amplitude) between successive tones, with the frequency bands where there is no data being ignored. The standard deviation can be represented as $\sigma(|UER_i, -UER_{i-1}|)$.

The calculated standard deviation can then be compared against an associated threshold in step 504. If the calculated standard deviation is less than the associated threshold, then in step 506, the line can be flagged as having a disconnection close to or at the DSLAM.

Examples of the invention are realised, at least in part, by executable computer program code which may be embodied in an application program data. When such computer program code is loaded into the memory of the processor in the test module 124, it provides a computer program code structure which is capable of performing at least part of the methods in accordance with the above-described examples.

A person skilled in the art will appreciate that the computer program structure referred to can correspond to the flow chart shown in FIG. 4, where each step of the flow chart can correspond to at least one line of computer program code and that such, in combination with the processor in the test module 124, provides apparatus for effecting the described process.

The invention claimed is:

1. A method of detecting a short loop length termination fault in a digital subscriber line, said method comprising:
   generating a test echo response from the digital subscriber line using a single ended line test, wherein said test echo response comprises an amplitude at each of the plurality of successive frequency tones;
   calculating a result of a function applied to the differences of the amplitude between successive tones;
   performing a comparison of the result to a predetermined threshold;
   determining that there is short loop length termination fault in the digital subscriber line in dependence on an outcome of the comparison.

2. A method according to claim 1, wherein the function is a sum.

3. A method according to claim 1, wherein the function is a standard deviation.

4. A method according to claim 1, wherein the test echo response is generated by sending a test signal comprising a frequency sweep over the frequency tones.

5. A method according to claim 4, wherein the amplitude of the frequency sweep over the frequency tones is flat.

6. A method according to claim 4, wherein the test signal is generated by a DSLAM.

7. A test module for detecting a short loop length termination fault in a digital subscriber line, said test module adapted in operation to:
   generate a test echo response from the digital subscriber line using a single ended line test, wherein said test echo response comprises an amplitude at each of the plurality of successive frequency tones;
   calculate a result of a function applied to the differences of the amplitude between successive tones;
   perform a comparison of the result to a predetermined threshold;

determine that there is short loop length termination fault in the digital subscriber line in dependence on an outcome of the comparison.

* * * * *